United States Patent
Strein et al.

(10) Patent No.: US 9,681,182 B2
(45) Date of Patent: Jun. 13, 2017

(54) REAL-TIME TRANSMISSION OF DYNAMIC RANGE TAGS IN A VIDEO BROADCAST

(71) Applicant: Disney Enterprises, Inc., Burbank, CA (US)

(72) Inventors: Michael J. Strein, New York, NY (US); Kenneth J. Michel, Brightwaters, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/930,310

(22) Filed: Nov. 2, 2015

(65) Prior Publication Data
US 2017/0127126 A1    May 4, 2017

(51) Int. Cl.
*H04N 7/173*      (2011.01)
*H04N 21/44*      (2011.01)
*H04N 21/61*      (2011.01)
*H04N 21/845*     (2011.01)
*H04N 21/2187*    (2011.01)

(52) U.S. Cl.
CPC ......... *H04N 21/44* (2013.01); *H04N 21/2187* (2013.01); *H04N 21/6125* (2013.01); *H04N 21/845* (2013.01)

(58) Field of Classification Search
CPC combination set(s) only.
See application file for complete search history.

(56) References Cited

U.S. PATENT DOCUMENTS

| | | | |
|---|---|---|---|
| 8,879,895 B1 * | 11/2014 | Bussieres | H04N 5/76 369/4 |
| 9,338,389 B2 * | 5/2016 | Messmer | H04N 5/20 |
| 2016/0241829 A1 * | 8/2016 | Qu | G09G 5/006 |

* cited by examiner

*Primary Examiner* — Mulugeta Mengesha
(74) *Attorney, Agent, or Firm* — Farjami & Farjami LLP

(57) ABSTRACT

There is provided systems and methods for storing and transmitting dynamic range tags in video using a non-transitory memory storing a video having a plurality of frames, a plurality of dynamic range tags corresponding to the plurality of frames, and a video tagging software, and a hardware processor executing the video tagging software stored in the non-transitory memory to obtain a frame of the plurality of frames of the video from the memory, obtain a dynamic range tag including information about the frame of the plurality of frames of the video from the memory, insert the dynamic range tag into a vertical ancillary data (VANC) space of the frame of the video to generate a modified video.

20 Claims, 5 Drawing Sheets

REAL-TIME TRANSMISSION OF DYNAMIC RANGE TAGS IN A VIDEO BROADCAST

BACKGROUND

Development of new cameras and display technologies continues to improve the depth and quality of pictures that can be shown in broadcast media. Advances in picture resolution have improved resolution from 1080p HD, to 4K, and even 8K content and 1080p HD, 4K, and 8K displays that are commercially available. Similarly, advances in dynamic range have led to high dynamic range (HDR) content and HDR displays that are commercially available. HDR contents provide greater dynamic ranges of luminosity and chrominance than what is possible with standard digital imaging or photographic techniques. However, HDR contents may not be enjoyed by if the video creation equipment, video production equipment, on which the HDR content is processed, or the display on which the HDR content is shown, processes the content using a standard dynamic range setting.

SUMMARY

The present disclosure is directed to systems and methods for real-time transmission of dynamic range tags in a video broadcast, substantially as shown in and/or described in connection with at least one of the figures, as set forth more completely in the claims.

DETAILED DESCRIPTION

Figure 1:
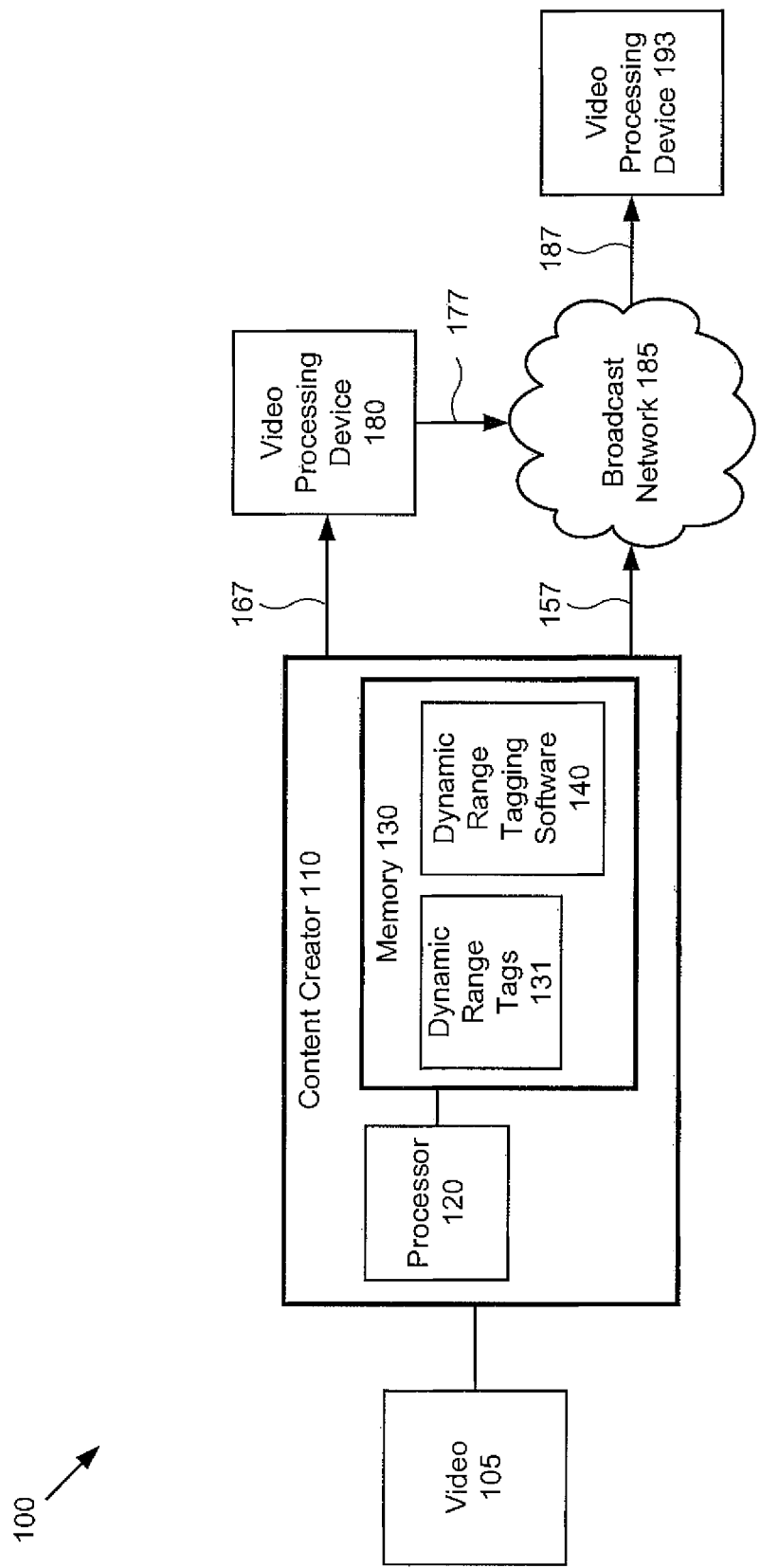
FIG. 1 shows a diagram of an exemplary system for real-time transmission of dynamic range tags in a video broadcast, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for real-time transmission of dynamic range tags in a video broadcast, according to one implementation of the present disclosure. System 100 includes video 105, content creator 110, video processing device 180, broadcast network 185, and video processing device 193. Content creator 110 is a computing device, which includes processor 120 and memory 130. Processor 120 is a hardware processor, such as a central processing unit (CPU) used in computing devices. Memory 130 is a non-transitory storage device for storing software for execution by processor 120, and also storing various data and parameters. Memory 130 includes dynamic range tags 131 and dynamic range tagging software 140.

Video 105 may be a video that is recorded for delayed broadcast or a live video broadcast, include a plurality of frames of video content. Video 105 may include any type of video data that is encoded and compressed into a video format for transmission to broadcast network 185. In some implementations, video 105 may be any type of video or live feed that is transmitted to and ready to be transmitted by broadcast network 185, or video 105 may be a video content suitable for transmission to video processing device 193 for playback.

Dynamic range tags 131 are utilized to provide information about video 105, such as information about one or more frames of video 105. In some implementations, dynamic range tags 131 may be a metadata container that can be used to provide frame-accurate information about one or more frames of a plurality of frames of video 105. In some implementations, dynamic range tags 131 include a dynamic range tag for use with each frame of video 105. A person may author and manually insert dynamic range tags 131 into video 105, or content creator 110 may create dynamic range tags 131 based on detected information about a frame of video 105, such as a color depth or bit depth of the frame, a color space of the frame, etc., and automatically insert dynamic range tags 131 into one or more frames of video 105. The information included in dynamic range tags 131 may include gamma or EOTF (electrical optical transfer function), peak luminance value (white clip), minimum luminance value (Black level), dynamic range indication, such as HDR, standard dynamic range (SDR), or enhanced dynamic range (EDR), color depth or bit depth, color space, such as NTSC, Rec. 709, Rec. 2020, sRGB, Adobe, ACES, etc., frame rate, raster size, stereo three dimensional (3D) or two dimensional (2D), or low/high light performance.

Dynamic range tagging software 140 is a computer algorithm stored in memory 130 for execution by processor 120 for inserting dynamic range tags 131 into video 105. Dynamic range tagging software 140 inserts dynamic range tags 131 into the Vertical Ancillary (VANC) Data space of one or more video frames of video 105. Ancillary data (commonly abbreviated as ANC data), in the context of television systems, refers to a means by which non-video information, such as audio, other forms of essence, and metadata, may be embedded within the serial digital interface. Ancillary data is standardized by SMPTE as *SMPTE 291M: Ancillary Data Packet and Space Formatting*, which is incorporated herein by reference. Ancillary data can be located in non-picture portions of horizontal scan lines. This is known as horizontal ancillary data (HANC). Ancillary data can also be located in non-picture regions of the frame. This is known as vertical ancillary data (VANC). Data is stored in the VANC by referencing Data ID's (DIDs) and Secondary Data ID's (SDIDs). SMPTE 291M allows an availability of DID/SDID combinations for user defined functions. SMPTE 291M is used for insertion of data into HDTV signals. There are also SMPTE standards for SDTV as well as UHDTV formats that may be used in various implementations disclosed herein.

Video processing device 180 is a device used in the creation and/or production of video 105. In some implementations, video processing device 180 may include a video editing device, a video recording device, a device used in post-production of video 105, etc. As shown in FIG. 1, video processing device 180 receives transmission 167 from content creator 110. Transmission 167 may include video 105 and dynamic range tags 131. In some implementations, transmission 167 may include video 105 that has been modified by inserting dynamic range tags 131 into video 135, such as into a VANC space of a frame of video 105. In some implementations, transmission 167 includes video 105 with a plurality of dynamic rage tags 131 inserted in the VANC space of a corresponding number of video frames of video 105. Video processing device 180 may then be used in further production of video 105, which may subsequently be transmitted to broadcast network 185 by transmission 177. In other implementations, video processing device 180 may be a device suitable for receiving video 105 and displaying video content. Video processing device 180 may include a tag extraction software for extracting dynamic range tags 131 from video 105. Video processing device 180 may include a display suitable for displaying video, such as a computer monitor, a television display, the display of a smart phone, the display of a tablet computer, etc.

Broadcast network 185 may be a television network, such as a conventional over-the-air television network, a cable television network, an Internet television network, or any other network suitable for receiving and transmitting video content such as video 105. As shown in FIG. 1, broadcast network 185 receives transmission 157 from content creator 110. Transmission 157 may include video 105 and dynamic range tags 131. In some implementations, transmission 157 may include video 105 that has been modified by inserting dynamic range tags 131 into video 135, such as into a VANC space of a frame of video 105. In some implementations, transmission 157 includes video 105 with a plurality of dynamic rage tags 131 inserted in the VANC space of a corresponding number of video frames of video 105. Broadcast network 185 may then send video 105 including dynamic range tags 131 over transmission 187 for display on video processing device 193. Video processing device 193 may be a device suitable for receiving transmission 187 and displaying video content, such as video 105. In some implementations, video processing device 193 may be a television, a computer, a tablet computer, a smart phone, etc.

Figure 2:
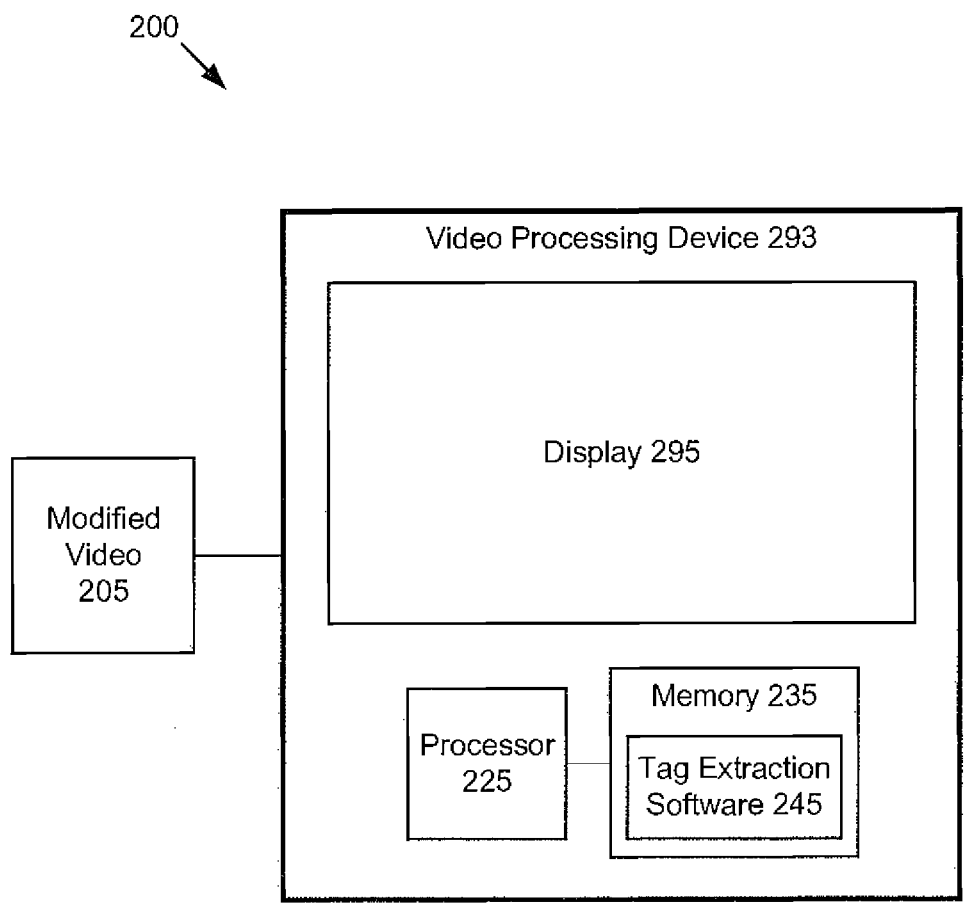
FIG. 2 shows a diagram of an exemplary video processing device for use in the system of FIG. 1, according to one implementation of the present disclosure.

FIG. 2 shows a diagram of an exemplary video processing device for use in the system of FIG. 1, according to one implementation of the present disclosure. Diagram 200 includes modified video 205, video processing device 293. In some implementations, video processing device 293 may be a device suitable for receiving transmission 187 and displaying video content, such as video 205. As shown in FIG. 2, video processing device 293 includes processor 225, memory 235, and display 295. Processor 225 is a hardware processor, such as a central processing unit (CPU) used in computing devices. Memory 235 is a non-transitory storage device for storing software for execution by processor 225, and also storing various data and parameters. Memory 235 includes tag extraction software 245. In some implementations, modified video 205 may be video 105 including dynamic range tags 131. In other implementations, video processing device 293 may be a device used in the creation and/or production of modified video 205. In some implementations, video processing device 293 may include a video editing device, a video recording device, a device used in post-production of modified video 205, etc.

Tag extraction software 245 is a computer algorithm stored in memory 235 for execution by processor 225 for extracting dynamic range tags 131 from modified video 205. In some implementations, tag extraction software 245 may extract information about a frame of modified video 205 or a plurality of frames of modified video 205. The information extracted may include gamma or EOTF (electrical optical transfer function), peak luminance value (white clip), minimum luminance value (Black level), dynamic range indication, such as high dynamic range (HDR), standard dynamic range (SDR), or enhanced dynamic range (EDR), color depth or bit depth, color space, such as NTSC, Rec. 709, Rec. 2020, sRGB, Adobe, ACES, etc., frame rate, raster size, stereo three dimensional (3D) or two dimensional (2D), or low/high light performance. In some implementations, tag extraction software 245 may extract the information from dynamic range tags 131.

Display 295 may include a display suitable for displaying video. In some implementations, display 295 may include a television, a computer monitor, a display of a tablet computer, or a display of a mobile phone. Display 295 may be a light emitting diode (LED) display, an organic light emitting diode (OLED) display, a liquid crystal display (LCD), a plasma display, a cathode ray tube (CRT), an electroluminescent display (ELD), or other display appropriate for viewing video content and/or animation content.

Figure 3:
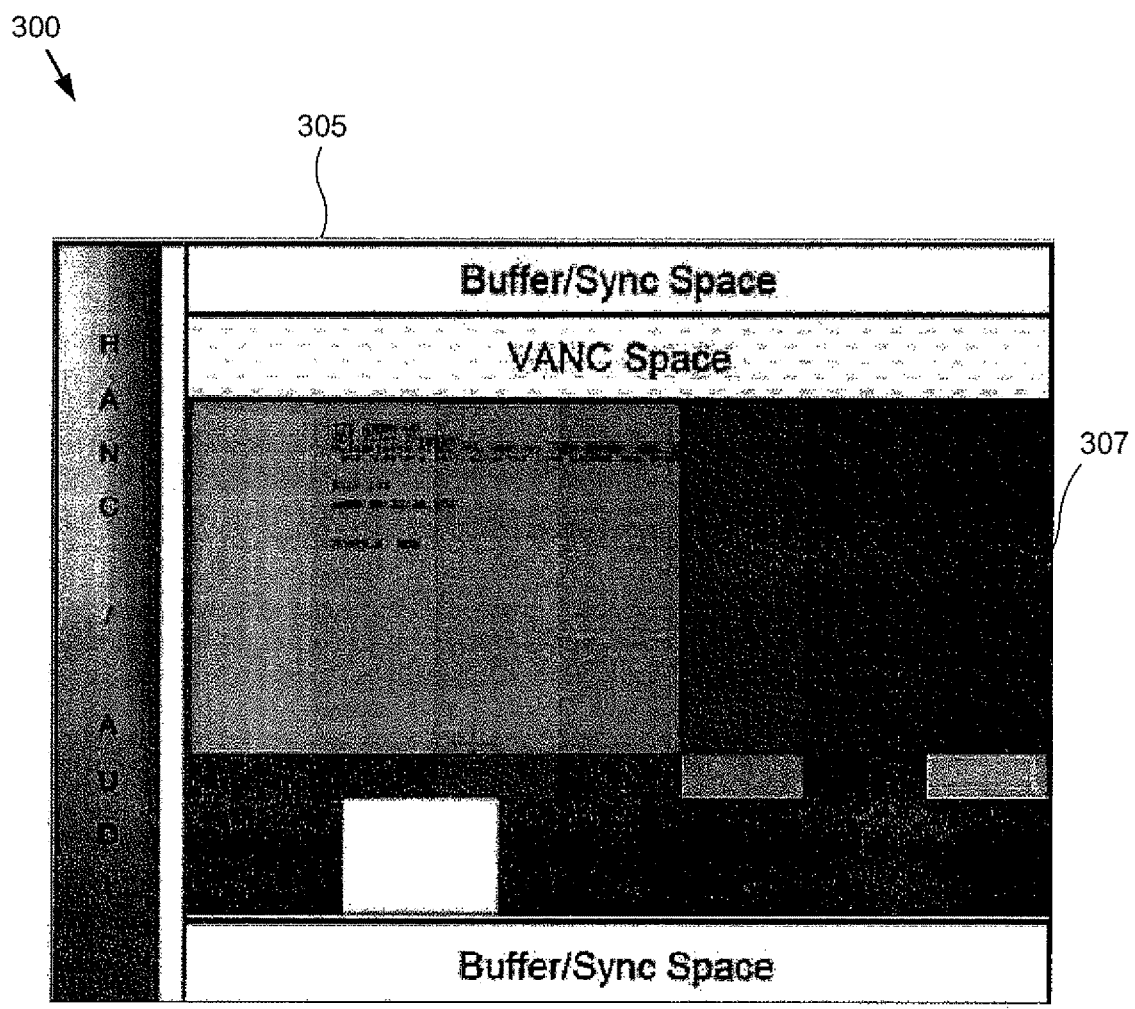
FIG. 3 shows a diagram of an exemplary video frame for use with the system of FIG. 1.

FIG. 3 shows a diagram of an exemplary state of the art video frame for use with the system of FIG. 1. Diagram 300 includes frame 305, which includes display area 307, buffer/sync space, VANC space, and horizontal ancillary data (HANC)/audio space. Display area 307 may be the active picture area of frame 305 where visual content is displayed, such as the portion of frame 305 that is shown on display 295. In some implementations, frame 305 may include ancillary information in the form of ancillary data packets. Ancillary data packets may be divided into two types, depending on where they are located. In some implementations, specific packet types may be constrained to be in one location or another. Ancillary packets located in the horizontal blanking region, after the end of active video but before the start of active video, regardless of line, may be known as horizontal ancillary data (HANC). HANC may be used for higher-bandwidth data, and/or for data that needs to be synchronized to a particular line. In some implementations, HANC may be used to embed audio. Ancillary packets located in the vertical blanking region, and after the start of active video but before the end of active video, are VANC. In some implementations, VANC may be used for low-bandwidth data, or for data that may be updated on a per-field or per-frame rate, such as closed caption data and dynamic range data.

Figure 4:
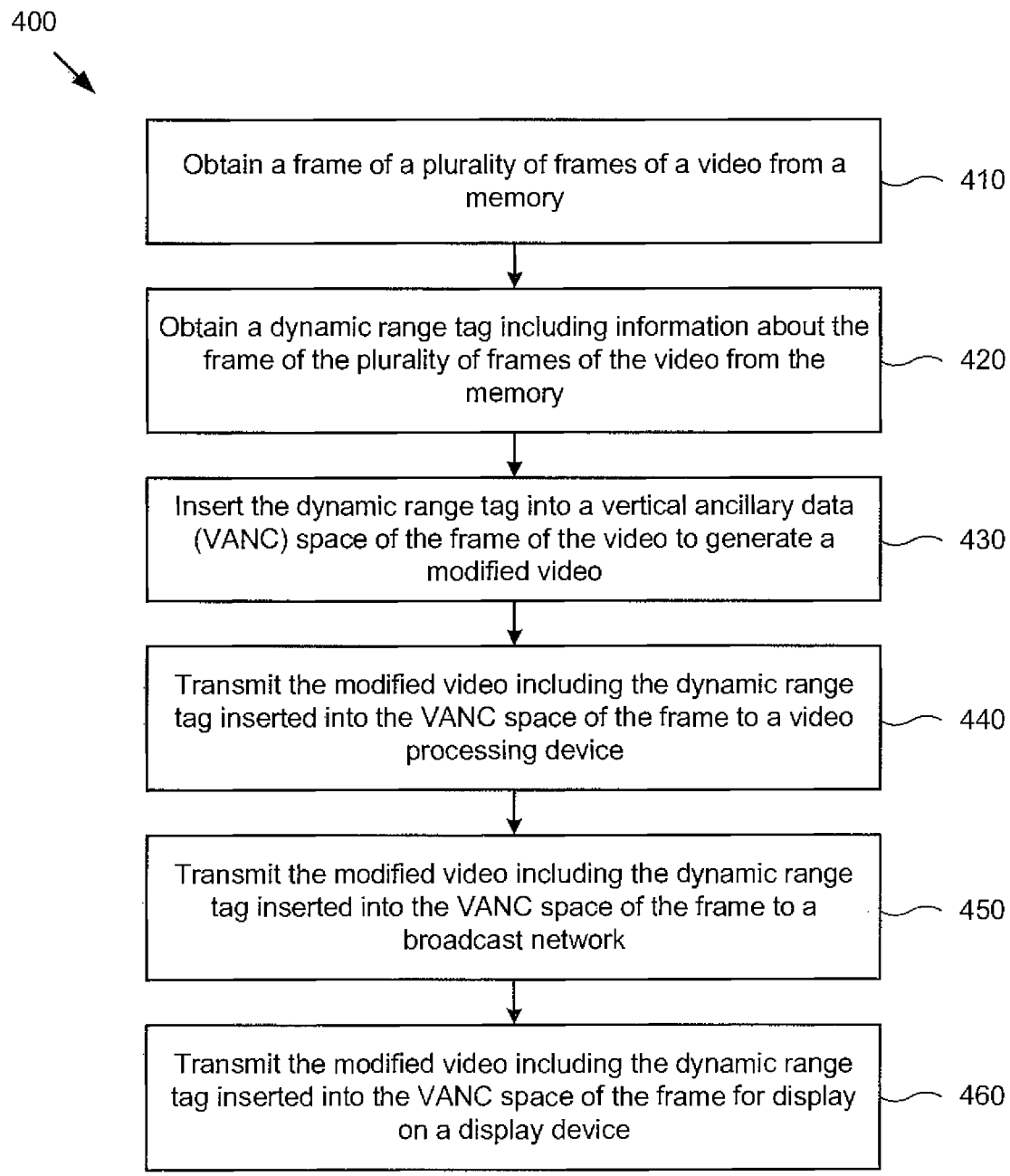
FIG. 4 shows a flowchart illustrating an exemplary method of transmitting dynamic range tags in a video broadcast, according to one implementation of the present disclosure.

FIG. 4 shows a flowchart illustrating an exemplary method of storing and transmitting dynamic range tags in video, according to one implementation of the present disclosure, according to one implementation of the present disclosure. Flowchart 400 begins at 410, where dynamic range tagging software 140 obtains a frame of a plurality of frames of video 105 from memory 130. In some implementations, video 105 may be a live feed or a recorded video for delayed broadcast. As discussed above, video 105 may include any type of video data that is encoded and compressed into a video format for transmission to broadcast network 185, or any type of video or live feed that is transmitted to and ready to be transmitted by broadcast network 185.

At 420, dynamic range tagging software 140 obtains dynamic range tags 131, including information about the frame of the plurality of frames of video 105, from memory 130. Dynamic range tags 131 may include information about the frame of video 105. In some implementations, a person may author information about each frame during the creation of video 105 and manually insert dynamic range tags 131 into video 105. In other implementations, dynamic range tagging software 140 may detect information about or features of each frame of video 105. For example, dynamic range tagging software 140 may detect features, such as a color space of each frame of video 105, a color depth of each frame of video 105, etc. In response to detecting each feature, dynamic range tagging software 140 may insert a corresponding one dynamic range tag into a frame of video 105. In some implementations, dynamic range tags 131 may include a metadata container that includes frame-accurate information about the frame of video 105. Dynamic range tags 131 may include information about the frame, and each frame of the plurality of frames may have a corresponding one of dynamic range tags 131.

In some implementations, each corresponding one of dynamic range tags 131 may include information about the corresponding frame, such as information relevant to the dynamic range of the frame, the color space of the frame, the frame rate of the video, the color depth of the frame, the minimum and peak luminance values of the frame, the gamma of the frame, the raster size of the frame, a low/high light performance, or the audio of the frame, i.e., if the audio is a 3D audio, such as DOLBY ATMOS®, or a 2D audio, such as 5.1 or 7.1 surround sound. In other implementations, each corresponding one of dynamic range tags 131 may include information only when the information is different than the preceding frame, otherwise the corresponding one of dynamic range tags 131 may indicate the information remains unchanged from the previous frame of video 105.

At 430, dynamic range tagging software 140 inserts dynamic range tags 131 into the VANC space of the frame of video 105 to generate modified video 205. Modified video 205 may include standard (legacy content) and high dynamic range images and graphics, which may be assembled and interspersed within a program, live feed, file based, streamed, or edited onto a playback source. Dynamic range tags 131 may be used to identify the dynamic range of each frame of modified video 205 in real-time to create an improved visual experience for the viewer. Dynamic range tags 131 inserted into the VANC space of modified video 205 may provide real-time frame-accurate information about modified video 205. At 440, content creator 110 transmits modified video 205 to video processing device 180. Video processing device 180 may extract dynamic range tags 131 from modified video 205 to use in creation, production, or display of modified video 205. In some implementations, dynamic range tags 131 may be translated to descriptive metadata for carriage in in file-based systems that carry the descriptive metadata as part of the header or as sidecar files, e.g. XML.

Flowchart 400 continues at 450, where content creator 110 transmits modified video 205, including the dynamic range tag inserted into the VANC space of the frame, to broadcast network 185 via transmission 157. At 460, after receiving the modified video 205, broadcast network 185 may transmit modified video 205, including the dynamic range tag inserted into the VANC space of the frame, for display on a video processing device 293 via transmission 187.

Figure 5:
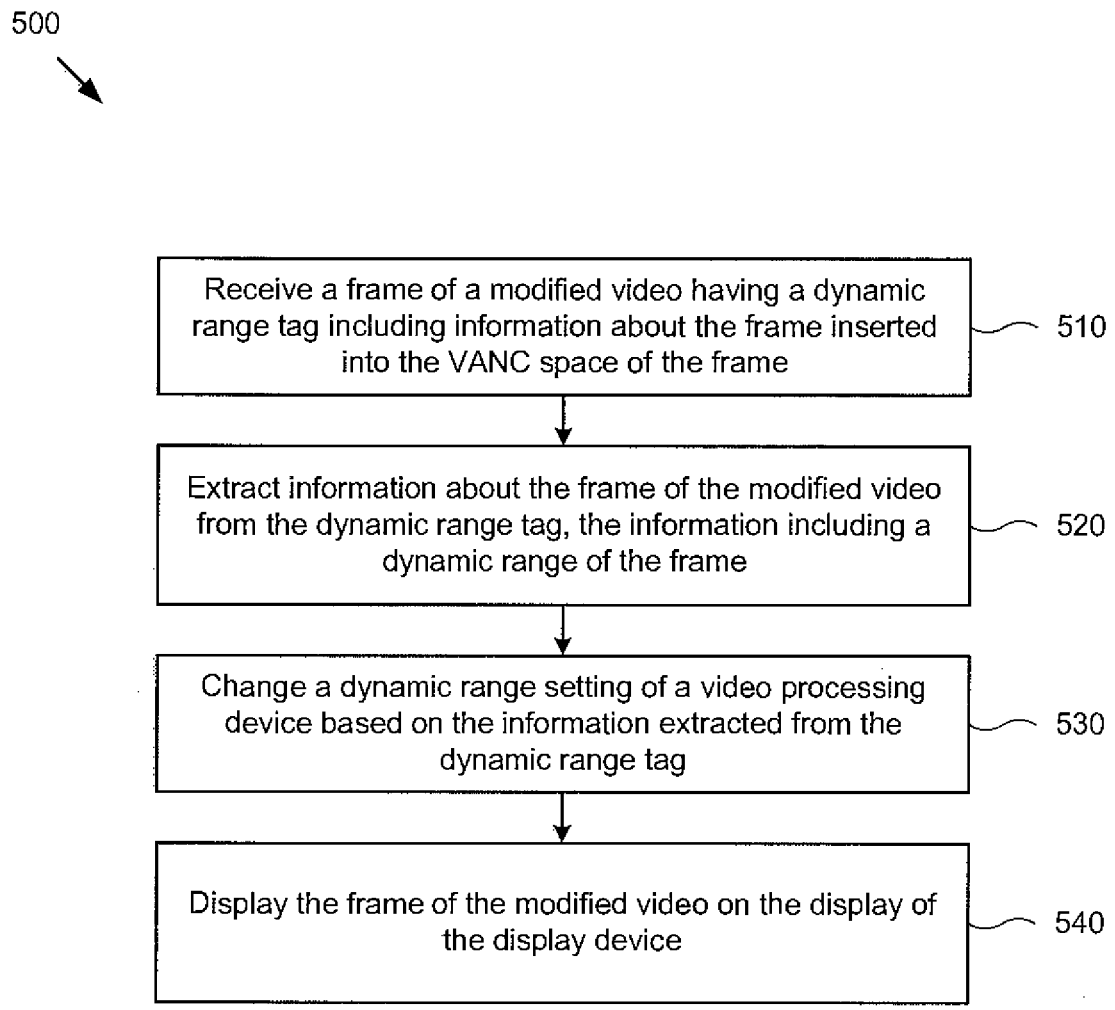
FIG. 5 shows a flowchart illustrating an exemplary method of utilizing dynamic range tags in a video broadcast received by the video processing device of FIG. 2, according to one implementation of the present disclosure.

FIG. 5 shows a flowchart illustrating an exemplary method of using a dynamic range tag in a video processing device, according to one implementation of the present disclosure. Flowchart 500 begins at 510, where video processing device 293 receives a frame of modified video 205 having dynamic range tags 131 including information about the frame inserted into the VANC space of the frame. Information extracted from dynamic range tags 131 may include information relevant to the dynamic range of the frame, the color space of the frame, the frame rate of the video, the color depth of the frame, the minimum and peak luminance values of the frame, the gamma of the frame, the raster size of the frame, a low/high light performance, or the audio of the frame, i.e., if the audio is a 3D audio, such as DOLBY ATMOS®, or a 2D audio, such as 5.1 or 7.1 surround sound.

At 520, tag extraction software 245 extracts information about the frame of modified video 205 from dynamic range tags 131, the information including a dynamic range of the frame. Continuing at 530, tag extraction software 245 changes a dynamic range setting of a video processing device such as video processing device 180 and/or video processing device 293 based on the information extracted from dynamic range tags 131. In some implementations, modified video 205 may include a plurality of frames, including some frames that have a high dynamic resolution and some that have a standard dynamic resolution. Tag extraction software 245 may change the dynamic range setting of video processing device 293 for each frame of the plurality of frames in modified video 205 based on the information extracted from dynamic range tags 131, so that each frame may be displayed with the corresponding dynamic range setting. Flowchart 500 continues at 540, where video processing device 293 displays the frame of modified video 205 on display 295.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a non-transitory memory storing a video having a plurality of frames, a plurality of dynamic range tags corresponding to the plurality of frames, and a video tagging software; and
   a hardware processor executing the video tagging software stored in the non-transitory memory to:
   obtain a frame of the plurality of frames of the video from the memory;
   detect a feature in the frame, wherein the feature in the frame comprises at least one of a color space of the frame and a color depth of the frame;
   in response to detecting the feature, create a dynamic range tag including information about the frame of the plurality of frames of the video from the memory; and
   insert the dynamic range tag into a vertical ancillary data (VANC) space of the frame of the video to generate a modified video.

2. The system of claim 1, wherein the hardware processor is further configured to:

transmit the modified video including the dynamic range tag inserted into the VANC space of the frame to a broadcast network.

3. The system of claim 2, wherein the broadcast network transmits the modified video including the dynamic range tag inserted into the VANC space of the frame for display on a display.

4. The system of claim 1, wherein the dynamic range tag includes a metadata container that includes frame-accurate information about the frame of the plurality of frames of the video.

5. The system of claim 1, wherein the information about the frame of the plurality of frames of the video includes at least one of the color depth of the frame of the plurality of frames, the color space of the frame of the plurality of frames, a gamma value of the frame of the plurality of frames, a dynamic range indication of the frame of the plurality of frames.

6. The system of claim 1, wherein the video is one of a live feed and a delayed broadcast.

7. The system of claim 1, wherein the hardware processor is configured to perform obtaining, obtaining, and inserting for each of the plurality of frames of the video.

8. The system of claim 1, wherein the hardware processor is further configured to:
    transmit the modified video including the dynamic range tag inserted into the VANC space of the frame to a video processing device.

9. The system of claim 8, wherein the video processing device is configured to:
    extract information about the frame of the modified video from the dynamic range tag; and
    change a dynamic range setting of the video processing device based on the information extracted from the dynamic range tag.

10. The system of claim 1, wherein the broadcast network uses the dynamic range tag inserted in the VANC space of the frame to transmit real-time frame-accurate dynamic range information about the frame of the plurality of frames of the video.

11. A method for use by a dynamic range tag insertion system of inserting an event tag in a media content, the system having a non-transitory memory and a hardware processor, the method comprising:
    obtaining, using the hardware processor, a frame of a plurality of frames of a video from the non-transitory memory;
    detecting a feature in the frame, wherein the feature in the frame comprises at least one of a color space of the frame and a color depth of the frame;
    in response to detecting the feature, creating a dynamic range tag including information about the frame of the plurality of frames of the video from the memory; and
    obtaining, using the hardware processor, a dynamic range tag including information about the frame of the plurality of frames of the video;
    inserting, using the hardware processor, the dynamic range tag into a vertical ancillary data (VANC) space of the frame of the video to generate a modified video.

12. The method of claim 11, further comprising:
    transmitting, using the hardware processor, the modified video including the dynamic range tag inserted into the VANC space of the frame to a broadcast network.

13. The method of claim 12, wherein the broadcast network transmits the modified video including the dynamic range tag inserted into the VANC space of the frame for display on a display.

14. The method of claim 11, wherein the dynamic range tag includes a metadata container that includes frame-accurate information about the frame of the plurality of frames of the video.

15. The method of claim 11, wherein the information about the frame of the plurality of frames of the video includes at least one of the color depth of the frame of the plurality of frames, the color space of the frame of the plurality of frames, a gamma value of the frame of the plurality of frames, a dynamic range indication of the frame of the plurality of frames.

16. The method of claim 11, wherein the video is one of a live feed and a delayed broadcast.

17. The method of claim 11, further comprising obtaining, obtaining, and inserting for each of the plurality of frames of the video.

18. The method of claim 11, further comprising:
    transmitting, using the hardware processor, the modified video including the dynamic range tag inserted into the VANC space of the frame to a video processing device.

19. The method of claim 18, wherein the video processing device includes a second processor, the method further comprising:
    extracting, using the second processor, information about the frame of the modified video from the dynamic range tag; and
    changing, using the second processor, a dynamic range setting of the video processing device based on the information extracted from the dynamic range tag.

20. The method of claim 11, wherein the broadcast network uses the dynamic range tag inserted in the VANC space of the frame to transmit real-time frame-accurate dynamic range information about the frame of the plurality of frames of the video.

* * * * *